April 23, 1957  J. W. STUDEBAKER ET AL  2,789,370
EDUCATIONAL WORKBOOK

Filed June 28, 1954                                    3 Sheets-Sheet 1

Inventors
John W. Studebaker
John G. Studebaker
By Bair, Freeman & Molinare
Attys April 23, 1957 J. W. STUDEBAKER ET AL 2,789,370
EDUCATIONAL WORKBOOK
Filed June 28, 1954 3 Sheets-Sheet 2

Inventors
John W. Studebaker
John G. Studebaker
By Bair, Freeman & Molinare
Attys April 23, 1957  J. W. STUDEBAKER ET AL  2,789,370
EDUCATIONAL WORKBOOK
Filed June 28, 1954  3 Sheets-Sheet 3
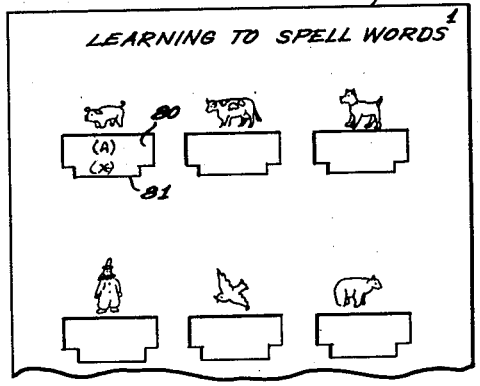
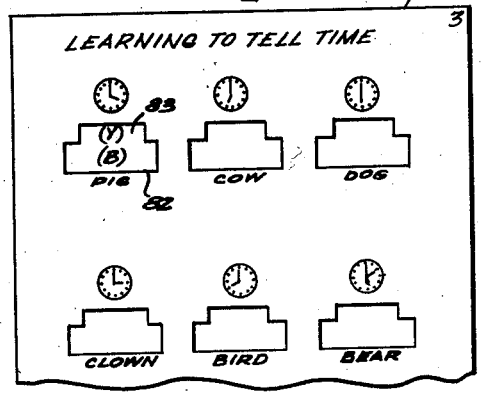
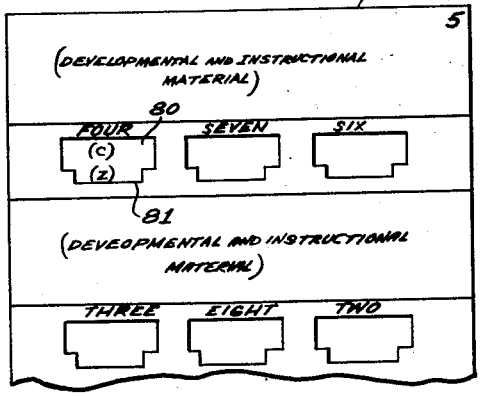
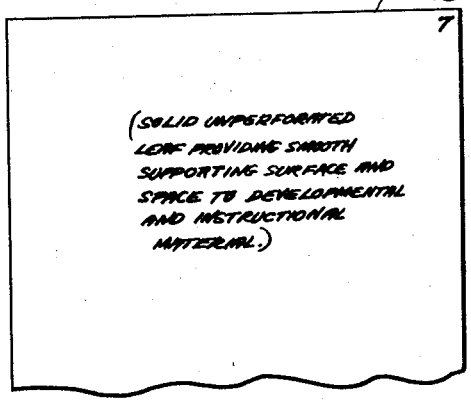
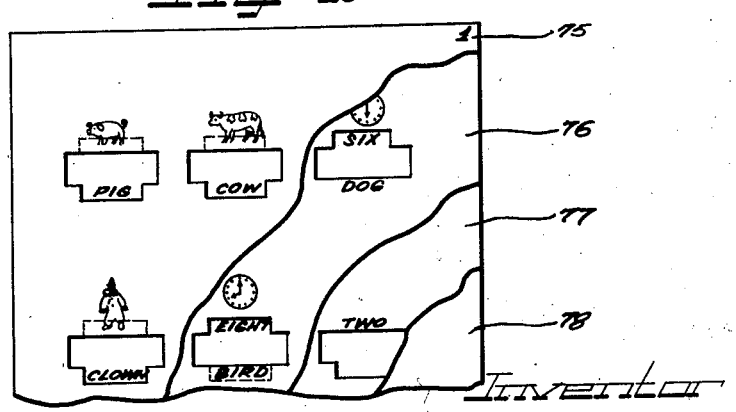
Inventor
John W. Studebaker
John G. Studebaker
Bair, Freeman & Molinare Attys

United States Patent Office 2,789,370
Patented Apr. 23, 1957

2,789,370

EDUCATIONAL WORKBOOK

John W. Studebaker and John G. Studebaker, Bronxville, N. Y.

Application June 28, 1954, Serial No. 439,742

13 Claims. (Cl. 35—9)

This invention relates to an educational workbook having perforated or apertured leaves containing incomplete subject matter adjacent the apertures on one side of the leaf and completing subject matter on the other side or visible through accompanying apertures or extension openings of apertures from the sheet beneath. More particularly, the invention relates to a workbook of the nature indicated having a unique arrangement and interrelationship of leaves and pages and of the mechanical structure and typography of leaves and pages, whereby the learner may study the exercises, test himself on his achievement by writing in responses to the incomplete subject matter through the apertures on a separate blank sheet of paper inserted beneath the perforated sheet, and then check the accuracy of his responses by properly aligning the responses on the separate sheet beneath the apertures adjacent to which the correct completed subject matter is printed.

One object of the invention is to provide a workbook of the type described in which the apertured leaves are interspersed with solid unapertured leaves capable of bridging the apertures in the underlying apertured leaves to provide a smooth supporting surface for a separate sheet of paper upon which responses are to be written.

Another object is to provide such a workbook containing a plurality of leaves, each of which contains a first and a second set of apertures arranged in pairs according to plan, the apertures of the first set being in registration with the corresponding apertures in adjacent leaves, incomplete subject matter being printed adjacent the apertures in said first set, each aperture in the second set being adjacent an aperture of the first set and in registration with completing subject matter printed on the leaf beneath, these perforated leaves being interspersed with unperforated leaves capable of bridging the apertures in the perforated leaves to provide a smooth writing surface for a separate sheet of paper upon which the responses are to be written.

Other objects and advantages of our novel workbook construction will appear from the following description as illustrated in the accompanying drawings, in which:

Figures 11-14 are plan views of four successive leaves of another form of our workbook in which the basic apertures are modified by extension apertures joined thereto.

Figure 15 is a plan view of the assembled leaves shown in Figures 11-14.

Figure 1:
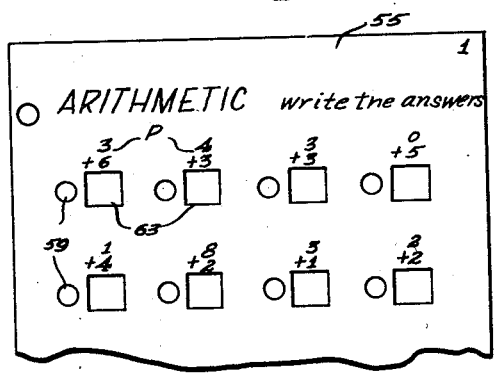
Figures 1-4 are plan views of four successive leaves from a book constructed in accordance with our invention in which the completing subject matter is visible through a second set of apertures in the perforated sheets.

In the various forms of the invention described and illustrated herein, incomplete subject matter appears adjacent the apertures in the apertured leaves, and the correct, related completing subject matter is visible through corresponding supplementary openings associated with the apertures. The related completing subject matter is printed on an underlying leaf and is always obscured by an inserted work sheet upon which responses called for by the incomplete subject matter may be written. All arrangements of leaves, apertures, and typography are so planned as to render self-checking of written completing subject matter convenient since, when the work sheet containing the written completing subject matter is properly placed in relation to the pages containing the related printed completing subject matter, all of the items in both the printed completing subject matter and in the related written completing subject matter will be in close proximity.

The leaves shown in the drawing may be bound into a book along the edge by rings or may be sewn or stapled as desired. The book will normally include a number of pages duplicating those shown in Figures 1 through 4, or other sets of pages arranged somewhat differently, as described hereinbelow.

Referring now to Figure 1–5, a series of leaves 55, 56 and 57 contain two sets of apertures each, the first set being designated by the numeral 63 and the second set being designated by the numerals 59, 60 and 61. The second set of apertures may be referred to herein and in the claims as "supplementary openings." The leaves are bound in a book, not shown in these figures. The apertures 63 are located immediately adjacent apertures 59 in pairs according to plan. The exposed surface of the leaf 55 is designated as page 1 and the succeeding pages are numbered consecutively. Incomplete subject matter P, such as figures to be added as shown on page 1, appears adjacent the upper margin of each of the apertures 63 in the leaf 55. The incomplete subject matter may take other forms for instruction in fields other than arithmetic and need not necessarily be located immediately adjacent an aperture. The correct response to the incomplete subject matter is visible through the apertures 59 located immediately to the left of the apertures 63, the responses being printed on the underlying sheet, namely, page 3, of the leaf 56.

Figure 2:
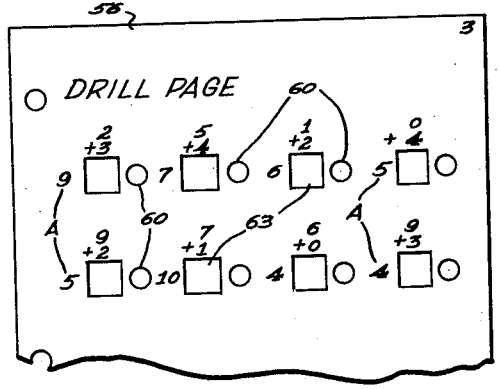
Figure 3:
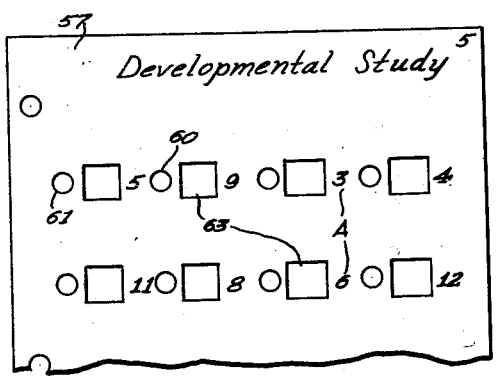
Figure 4:
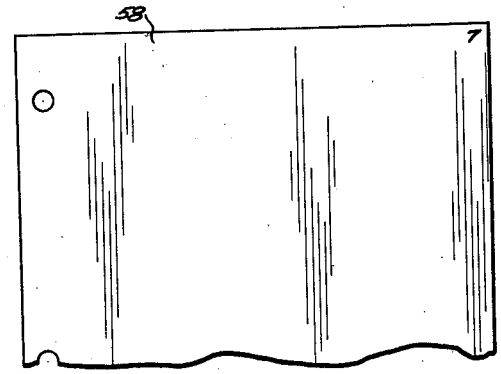
Figure 5:
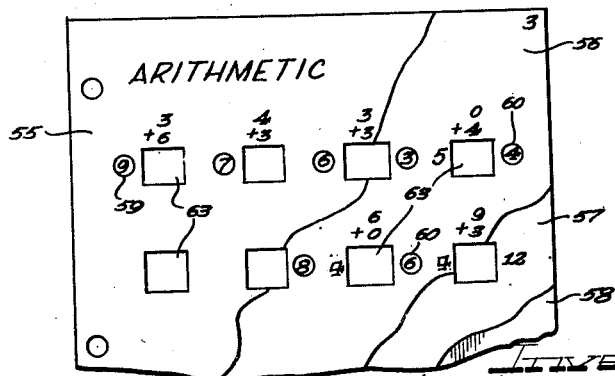
Figure 5 is a plan view of the assembled leaves shown in Figures 1-4.
Figure 6:
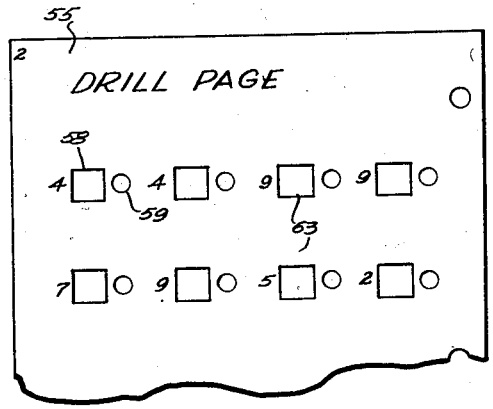
Figures 6-9 are plan views of the reverse side of the leaves shown in Figures 1-4.
Figure 7:
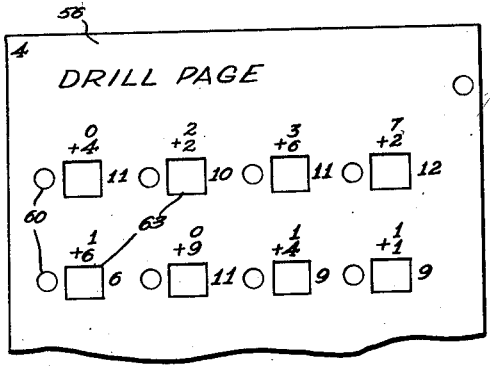
Figure 8:
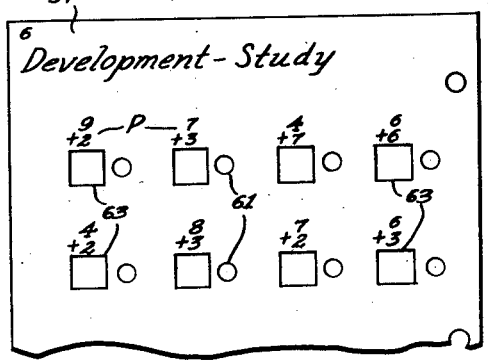
Figure 9:
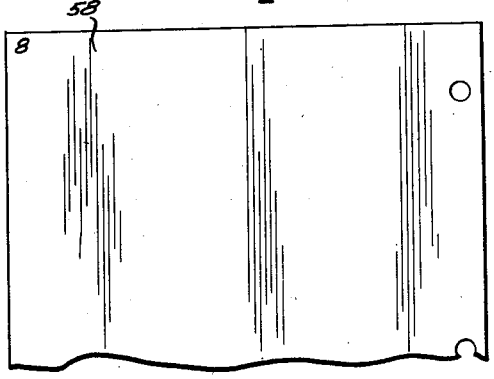
Figure 10:
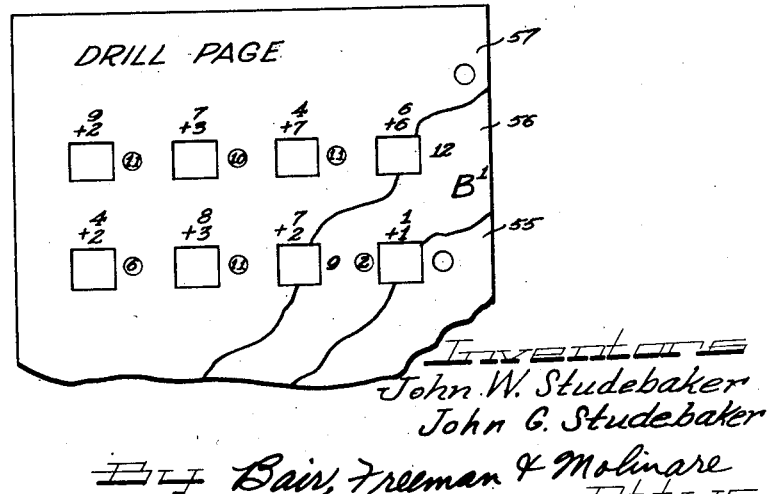
Figure 10 is a plan view of the reverse side of leaves 55, 56 and 57 shown in Figure 5.

As shown in Figure 2, page 3 of leaf 56 also contains incomplete subject matter adjacent each one of the apertures 63, which are aligned directly with the apertures 63 in the leaf 55. The completing subject matter for the problems P on page 1 is designated as A. The alignment of the apertures is best shown in Figure 5 in which the leaves 55, 56, 57 and 58 are assembled in order. The leaf 56 also has a second set of apertures or supplementary openings 60 located opposite the completing subject matter A. Completing subject matter for the problems on page 3 is visible through the apertures 60, this completing subject matter being printed on page 5 of the leaf 57. Page 5 bears no incomplete subject matter. Apertures 63 are cut in the leaf 57, these apertures corresponding exactly to apertures designated by the same numeral in leaves 55 and 56. The completing subject matter for the incomplete material on page 3 is designated as A and appears on page 5 directly beneath the apertures 60, so that it is visible therethrough. Directly opposite this completing subject matter A on page 5, on the other side of the apertures 63, is a series of apertures 61, the purpose of which will appear hereinafter.

Leaves 55, 56 and 57 are backed by a non-perforated leaf 58, or several such leaves, which serve to bridge over the apertures in the leaves lying beneath, to provide a smooth writing surface for work sheets placed beneath the apertured sheets. Explanatory matter may be printed on page 7 of leaf 58.

The particular arrangement of subject matter described permits the student to study both the incomplete and the complete subject matter simultaneously until he has mastered the problems. Referring to page 1 (Figure 5) it will be noted that the answers A to the problems P on that page are visible through apertures 59, to the left of the apertures 63 through which the response is to be written. Since the answer A is printed on the underlying sheet, the answers are not visible when the student inserts a work sheet beneath the leaf 55. When ready to test himself the work sheet is inserted in this manner and the responses are written through the apertures 63. Then, to check his responses, the student removes the work sheet and re-inserts it beneath the leaf 56. Thus the responses written on the work sheet are visible through the apertures 63 on page 1, and the aligned apertures 63 on page 3 simultaneously, with the correct completing subject matter printed on page 3, being visible through the apertures 59. In this way the student may check simultaneously the incomplete subject matter on page 1, his responses thereto on the work sheet beneath leaf 56 and the correct response printed on page 3, and visible through apertures 59.

Preferably, the two sets of apertures, one provided for writing the response, the other for making visible completing subject matter beneath, are of different geometrical configurations. In the drawing we have shown one set as squares and the other set as circles. It will be understood, however, that the apertures in any set may be rectangular, oval, triangular, or any other desirable shape. However, all apertures in one set preferably of the same configuration to facilitate indentification.

In the modification of the invention just described, it is necessary that the inserted work sheet span one and sometimes two superimposed apertures since the solid sheet 58 must be bound between each set of three apertured sheets to accomplish the purpose of the device. In such cases, care must be taken to use relatively large apertures and relatively thin apertured sheets. We have found that 28–32 pound paper, with normal sized apertures required for writing responses, is satisfactory where two apertured leaves separate the work sheet from the solid unapertured leaf. Where three apertured sheets separate the work sheet from the solid leaf, with the same weight paper, the apertures should be slightly larger, the exact size being determined by the elimination of any "drum effect" due to stretching the work sheet across the apertures.

Reference is now made to Figures 6–10, which are plan views of the reverse side of the leaves 55, 56, 57 and 58. Page 6 of the leaf 57 is the same as page 1 of leaf 55, except for the subject matter. It bears problems or incomplete subject matter designated as P adjacent to apertures 63 through which the responses are to be written on underlying work sheets. The correct response is printed on page 4 of leaf 56 and is visible through the circular apertures 61. Page 4 corresponds to page 3 on the opposite side of leaf 56. Here we have a series of problems adjacent to apertures 63 and the correct responses thereto printed on page 2 of leaf 55. The responses are visible through apertures 60 located to the left of the apertures 63 in leaf 56. Page 2 of the leaf 55 bears only completing subject matter visible through the apertures 60 of the leaf 56.

It will be seen that by employing this arrangement both sides of each leaf may be used advantageously, thus economizing in the utilization of space. The blank portions of pages 2 and 5 may be advantageously employed for presenting developmental and study material.

Another modification of the invention is shown in Figures 11–15. This modification differs from that shown in Figures 1–10 in that the supplementary openings communicate with the basic apertures. Apertured leaves 75, 76 and 77 are interspersed with one or more solid unapertured leaves 78. Apertures through the leaves 75 and 77 have a basic opening 80 joined to an extension opening 81 extending downwardly. Leaf 76 has similar apertures having a basic opening 82 joined to an extension opening 83 extending upwardly. Basic openings 80 and 82 are aligned in each successive apertured leaf, but the extensions turn alternately upwardly and downwardly in successive leaves. The basic spaces in successive leaves are aligned and identified by the letters (A), (B) and (C) while the extension spaces are designated (x), (y) and (z). The device shown in Figure 11 is an exercise to teach spelling of simple words. A picture representing the word to be spelled is printed above the basic aperture 80 on page 1 of leaf 75. The word correctly spelled is printed on page 3 of leaf 76 (Figure 12) and is visible through the extensions 81 of the apertures 80 to permit self study. A work sheet is inserted beneath leaf 75, thus obscuring the printed responses, and the response is written thereon through aperture 80. The supporting surface for the work sheet is unapertured leaf 78, which serves well for this purpose even through two apertured leaves 76 and 77 intervene. To prevent a "drum effect" due to stretching the work sheet over the apertures, the apertured leaves must be made from relatively light stock and the apertures must be large enough to permit the work sheet to rest on leaf 78 rather than span the aperture. The written responses may be checked by placing the work sheet beneath leaf 76, thus making the incomplete subject matter (picture), the correct printed response and the written response all visible simultaneously. A similar arrangement exists between leaves 76 and 77 for teaching the student to tell time. As explained previously with respect to other forms of the invention the reverse sides of leaves 75, 76 and 77 (pages 2, 4 and 6) may cooperate exactly like pages 1, 3 and 5 to teach similar or different subjects.

It will be understood that the device of Figures 11–15 may be modified by providing a single large basic aperture with a plurality of extensions through which the correct responses are visible. The extensions may join the basic apertures at the side boundaries as well as at the top and bottom. In all such arrangements, however, the basic apertures in each apertured leaf are aligned while the extension apertures join to opposite sides thereof in alternate leaves. It will also be apparent that the size and shape of the apertures may be varied at will without departing from the basic concept of the invention.

The various devices illustrated are not restricted to the particular subject matter shown and described, but may be used to teach any subject desired, some forms, of course, being more suitable for some subjects than for others. It will also be apparent that the arrangement of the various apertures and sheets comprising our workbook may be modified to a considerable extent without departing from the spirit of the invention. It is, therefore, our intention not to be bound by the illustrations set forth in the specification otherwise than as necessitated by the scope of the appended claims.

We claim as our invention:

1. An educational workbook for use with insertable worksheets on which answers may be written by a learner, comprising a plurality of pairs of leaves, said leaves containing registering apertures and the first leaf of each pair carrying questions associated with its apertures while the second leaf carries corresponding answers, a supplementary opening associated with each aperture in said first leaf through which the answers carried by the second leaf may be read, and a leaf underlying said pairs of leaves providing a smooth supporting writing surface for the inserted worksheet.

2. The workbook of claim 1 wherein said supplementary openings are spaced from their associated apertures.

3. The workbook of claim 1 wherein said supplementary openings connect with their associated apertures.

4. A book comprising a plurality of pairs of leaves, said leaves containing registering apertures, the first leaf of each pair carrying questions associated with its apertures while the second leaf carries corresponding answers, a supplementary opening associated with each aperture in said first leaf through which the answers carried by the second leaf may be read, a worksheet insertable under said first leaf on which answers to the problems are written, said worksheet being removable for insertion under both leaves for checking the accuracy of the answers visible through the aligned apertures and supplementary openings, and a leaf underlying said pairs of leaves providing a smooth supporting writing surface for the inserted worksheet.

5. The workbook of claim 4 wherein each of said supplementary openings is spaced from its associated aperture.

6. The workbook of claim 4 wherein each of said supplementary openings connects with its associated aperture.

7. The workbook of claim 5 wherein said supplementary openings are of a different geometrical configuration from their associated apertures.

8. The workbook of claim 4 wherein the opposite side of said second leaf carries questions and the opposite side of said first leaf carries corresponding answers.

9. The workbook of claim 5 wherein the supplementary openings in one leaf are not in registration with the supplementary openings of an adjacent leaf.

10. The workbook of claim 4 wherein said leaf providing a smooth supporting writing surface contains perforations out of registration with the apertures and openings in the leaves above so that the solid unperforated portion of the leaf underlies said apertures and openings.

11. The workbook of claim 6 wherein said supplementary openings in one leaf are staggered with respect to the supplementary openings in an adjacent leaf.

12. A book comprising a set of three leaves having six pages, said leaves containing registering apertures, the first and third pages carrying questions associated with the apertures while the third and fifth pages, respectively, carry corresponding answers, a supplementary opening associated with each aperture in each leaf through which answers carried by an underlying leaf may be read, a worksheet insertable under the first or second of said three leaves on which answers to the problems are written, said worksheet being removable for insertion under the second or third leaves for checking the accuracy of the answers visible through the aligned apertures and supplementary openings, and a leaf beneath said three leaves providing a smooth supporting surface for the inserted worksheet.

13. The book of claim 12 wherein pages 6, 4 and 2 correspond in subject matter and arrangement to pages 1, 3 and 5, respectively, whereby both sides of the leaves are utilized.

References Cited in the file of this patent

UNITED STATES PATENTS

| | | |
|---|---|---|
| 1,163,184 | Thompson | Dec. 7, 1915 |
| 1,500,777 | Stevenson | July 8, 1924 |
| 1,617,657 | Studebaker | Feb. 15, 1927 |
| 1,781,047 | Bondeson | Nov. 11, 1930 |
| 2,137,447 | Ellis | Nov. 22, 1938 |
| 2,213,225 | Maggioni | Sept. 3, 1940 |
| 2,497,200 | Appel | Feb. 14, 1950 |
| 2,503,130 | Poritz | Apr. 4, 1950 |